(12) United States Patent
Tao et al.

(10) Patent No.: US 12,730,006 B2
(45) Date of Patent: Sep. 8, 2026

(54) RAMAN SPECTROSCOPY DEVICE

(71) Applicant: SHIMADZU CORPORATION, Kyoto (JP)

(72) Inventors: Tomoyo Tao, Kyoto (JP); Tomoki Sasayama, Kyoto (JP); Atsuhiko Otaguro, Kyoto (JP); Ryuta Shibutani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 94 days.

(21) Appl. No.: 18/687,813

(22) PCT Filed: Mar. 11, 2022

(86) PCT No.: PCT/JP2022/010759
§ 371 (c)(1),
(2) Date: Feb. 29, 2024

(87) PCT Pub. No.: WO2023/032290
PCT Pub. Date: Mar. 9, 2023

(65) Prior Publication Data

US 2026/0118177 A1 Apr. 30, 2026

(30) Foreign Application Priority Data

Aug. 31, 2021 (JP) ................................ 2021-141144

(51) Int. Cl.
*G01J 3/427* (2006.01)
*G01J 3/02* (2006.01)
*G01J 3/44* (2006.01)

(52) U.S. Cl.
CPC ............. *G01J 3/427* (2013.01); *G01J 3/0208* (2013.01); *G01J 3/4412* (2013.01)

(58) Field of Classification Search
CPC ......... G01J 3/427; G01J 3/0208; G01J 3/4412
See application file for complete search history.

(56) References Cited

U.S. PATENT DOCUMENTS 8,873,041 B1 10/2014 Chai et al.
10,746,600 B2 8/2020 Lambert
(Continued)

FOREIGN PATENT DOCUMENTS

JP 2009230021 A * 10/2009
JP 2012003198 A * 1/2012
(Continued)

OTHER PUBLICATIONS

"Written Opinion of the International Searching Authority (Form PCT/ISA/237) of PCT/JP2022/010759," mailed on Apr. 12, 2022, with English translation thereof, pp. 1-6.
(Continued)

*Primary Examiner* — Kara E. Geisel
*Assistant Examiner* — Roberto Fabian, Jr.
(74) *Attorney, Agent, or Firm* — JCIPRNET

(57) ABSTRACT

A Raman spectroscopy device includes a first spectrometer, a second spectrometer, and a photodetector. First spectrometer disperses first Raman scattered light. Second spectrometer disperses second Raman scattered light having a shorter wavelength than first Raman scattered light. Photodetector receives first Raman scattered light and second Raman scattered light. Second spectrometer is formed from a greater number of spectral optical elements than first spectrometer.

5 Claims, 2 Drawing Sheets

(56) References Cited

U.S. PATENT DOCUMENTS

2012/0033213 A1 2/2012 Yang et al.
2012/0099102 A1* 4/2012 Bello ........................ G01J 3/44
356/301

FOREIGN PATENT DOCUMENTS

KR 20190015553 A * 2/2019 ........... G01N 21/956
WO 2014060118 4/2014
WO WO-2014060118 A1 * 4/2014 ............ G01J 3/0272
WO WO-2021040063 A1 * 3/2021 ............ G01J 3/1804

OTHER PUBLICATIONS

"Search Report of Europe Counterpart Application", issued on Jun. 24, 2025, p. 1-p. 8.

* cited by examiner

RAMAN SPECTROSCOPY DEVICE

TECHNICAL FIELD

The present disclosure relates to a Raman spectroscopy device.

BACKGROUND ART

U.S. Pat. No. 8,873,041 (PTL 1) discloses a Raman spectroscopy device that uses two excitation wavelengths.

CITATION LIST

Patent Literature

PTL 1: U.S. Pat. No. 8,873,041

SUMMARY OF INVENTION

Technical Problem

An object of the present disclosure is to provide a Raman spectroscopy device at a reduced cost, where a measurable wavenumber range of a Raman spectrum of Raman scattered light that is emitted from a sample due to irradiation of an excitation light beam having a short wavelength among a plurality of excitation wavelengths on the sample may be increased.

Solution to Problem

A Raman spectroscopy device of the present disclosure includes a spectroscopic optical system and a photodetector. The spectroscopic optical system includes a first spectrometer and a second spectrometer. The first spectrometer disperses first Raman scattered light that is emitted from a sample when the sample is irradiated with a first excitation light beam. The second spectrometer disperses second Raman scattered light that is emitted from the sample when the sample is irradiated with a second excitation light beam having a shorter wavelength than the first excitation light beam, the second Raman scattered light having a shorter wavelength than the first Raman scattered light. The photodetector receives the first Raman scattered light and the second Raman scattered light output from the spectroscopic optical system. A second incident light path, inside the spectroscopic optical system, of the second Raman scattered light to the second spectrometer is different from a first incident light path, inside the spectroscopic optical system, of the first Raman scattered light to the first spectrometer. The second spectrometer is formed from a greater number of spectral optical elements than the first spectrometer.

Advantageous Effects of Invention

With the Raman spectroscopy device of the present disclosure, a measurable wavenumber range of a Raman spectrum of the second Raman scattered light that is emitted from a sample due to irradiation of the second excitation light beam having a shorter wavelength than the first excitation light beam on the sample may be increased, and also, a low cost may be achieved.

DESCRIPTION OF EMBODIMENTS

In the following, an embodiment of the present disclosure will be described. Same components will be denoted by a same reference sign, and a repeated description will be omitted.

Figure 1:
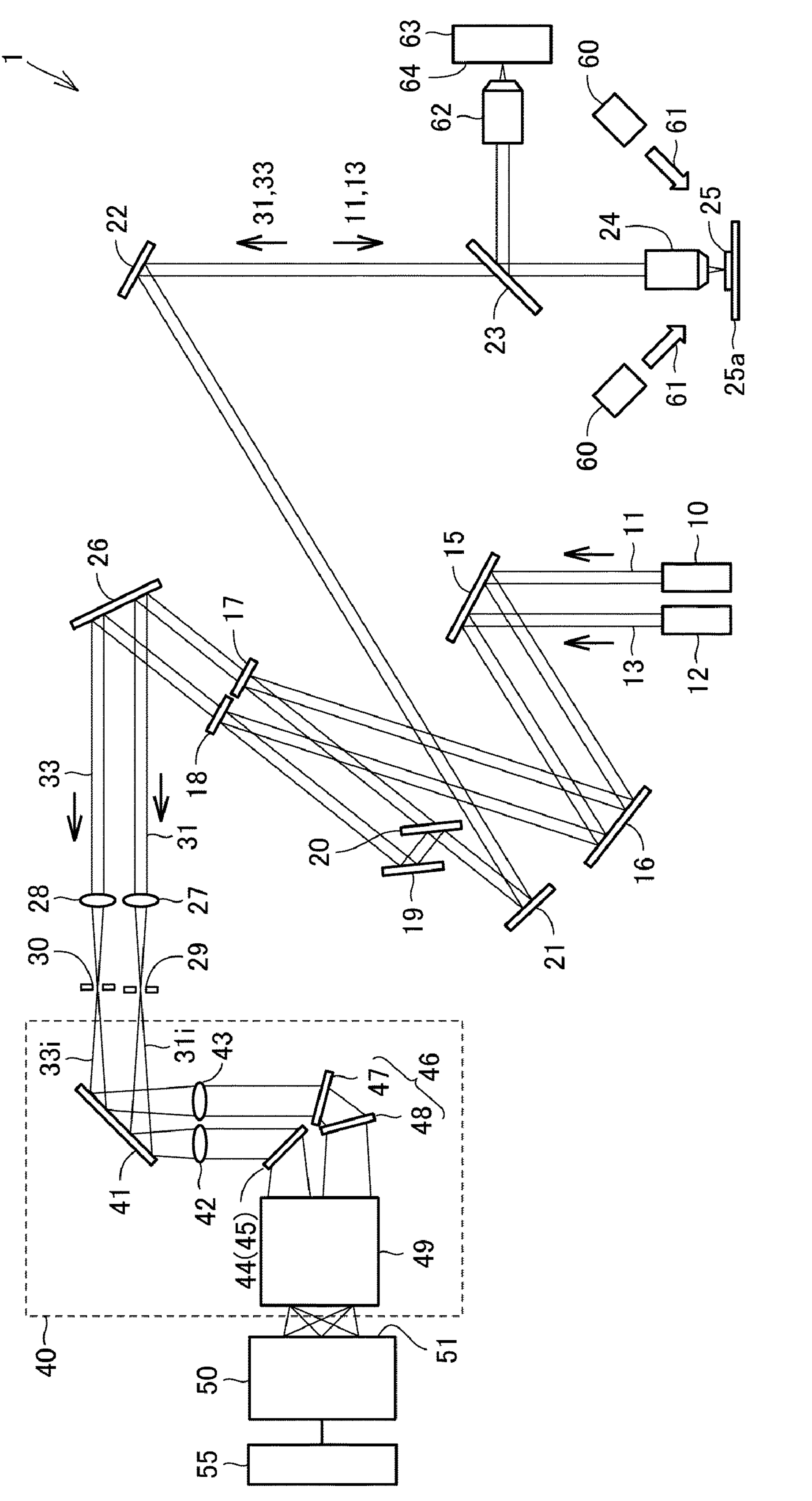
FIG. 1 is a schematic diagram of a Raman spectroscopy device of an embodiment.
Figure 2:
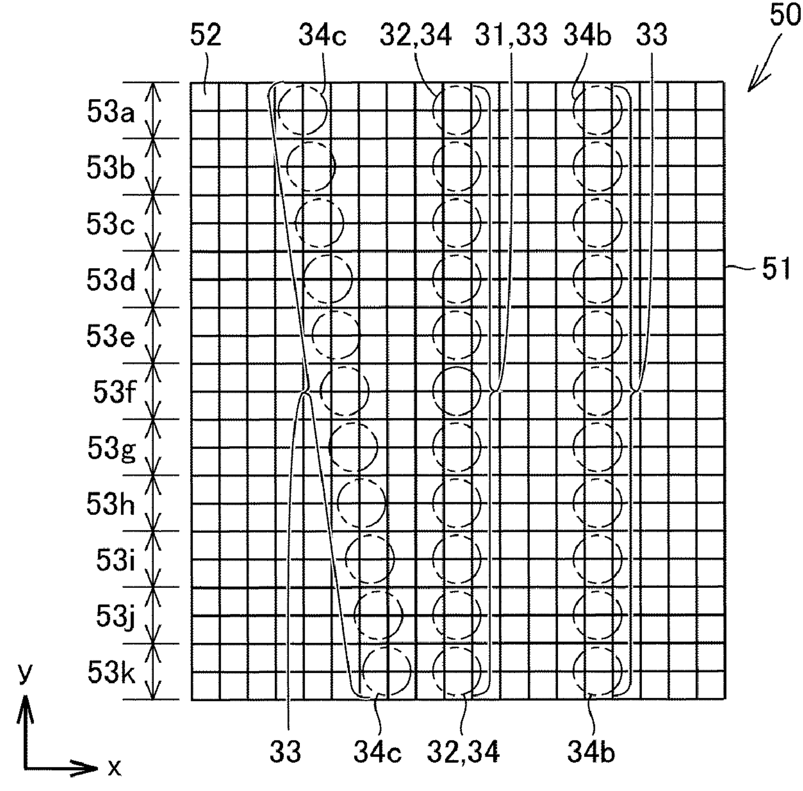
FIG. 2 is a partially enlarged schematic diagram of a photodetector of the Raman spectroscopy device of the embodiment.

With reference to FIGS. 1 and 2, a Raman spectroscopy device 1 of an embodiment will be described. Raman spectroscopy device 1 includes a first excitation light source 10, a second excitation light source 12, a sample support portion 25*a*, a spectroscopic optical system 40, a photodetector 50, a signal processor 55, mirrors 15, 16, 19, 21, 22, 26, low-pass filters 17, 18, a dichroic mirror 20, condenser lenses 27, 28, and slits 29, 30. Raman spectroscopy device 1 may further include an illumination light source 60, an objective lens 24, a semitransparent mirror 23, an imaging lens 62, and a camera 63.

First excitation light source 10 outputs a first excitation light beam 11. Second excitation light source 12 outputs a second excitation light beam 13 that has a shorter wavelength than first excitation light beam 11. A first wavelength of first excitation light beam 11 may be different from a second wavelength of second excitation light beam 13 by 40 nm or more, or 100 nm or more, or 200 nm or more. In an example, the first wavelength of first excitation light beam 11 is 785 nm, and the second wavelength of second excitation light beam 13 is 532 nm. In another example, the first wavelength of first excitation light beam 11 is 1064 nm, and the second wavelength of second excitation light beam 13 is 532 nm. For example, first excitation light source 10 and second excitation light source 12 are laser light sources, and first excitation light beam 11 and second excitation light beam 13 are laser beams. For example, first excitation light source 10 and second excitation light source 12 are diode laser-pumped solid-state lasers, helium-neon lasers, titanium-sapphire lasers, or Nd:YAG lasers.

A sample 25 is supported by sample support portion 25*a* such as a sample stage. One of first excitation light beam 11 and second excitation light beam 13 is irradiated on sample 25, depending on sample 25. The shorter the excitation wavelength, the higher the efficiency of Raman scattering. Accordingly, to increase intensity of Raman scattered light, sample 25 is irradiated not with first excitation light beam 11 but with second excitation light beam 13. In the case where sample 25 emits strong fluorescence when sample 25 is irradiated with second excitation light beam 13, sample 25 is irradiated not with second excitation light beam 13 but with first excitation light beam 11. Accordingly, a Raman spectrum of sample 25 may be obtained without being affected by the fluorescence.

First excitation light beam 11 output from first excitation light source 10 is reflected by mirrors 15, 16, and enters low-pass filter 17. Low-pass filter 17 reflects first excitation light beam 11, and transmits first Raman scattered light 31. First excitation light beam 11 is reflected by low-pass filter 17, and enters dichroic mirror 20. Dichroic mirror 20 transmits first excitation light beam 11 and first Raman scattered light 31, and reflects second excitation light beam 13 and second Raman scattered light 33. First excitation light beam 11 passes through dichroic mirror 20. First excitation light beam 11 is reflected by mirrors 21, 22. First excitation light beam 11 passes through semitransparent mirror 23 and objective lens 24, and is irradiated on sample 25.

Second excitation light beam 13 output from second excitation light source 12 is reflected by mirrors 15, 16, and enters low-pass filter 18. Low-pass filter 18 reflects second excitation light beam 13, and transmits second Raman scattered light 33. Second excitation light beam 13 is reflected by low-pass filter 18, mirror 19, and dichroic mirror 20. Second excitation light beam 13 is reflected by mirrors 21, 22. Second excitation light beam 13 passes through semitransparent mirror 23 and objective lens 24, and is irradiated on sample 25.

When sample 25 is irradiated with first excitation light beam 11, first Raman scattered light 31 is emitted from sample 25. First Raman scattered light 31 has a longer wavelength than first excitation light beam 11. First Raman scattered light 31 passes through objective lens 24 and semitransparent mirror 23, and is reflected by mirrors 21, 22. First Raman scattered light 31 passes through dichroic mirror 20 and low-pass filter 17, and is reflected by mirror 26. First Raman scattered light 31 is concentrated by condenser lens 27, passes through slit 29, and enters spectroscopic optical system 40.

When sample 25 is irradiated with second excitation light beam 13, second Raman scattered light 33 is emitted from sample 25. Second Raman scattered light 33 has a longer wavelength than second excitation light beam 13. Second Raman scattered light 33 has a shorter wavelength than first Raman scattered light 31. That is, first Raman scattered light 31 is long-wavelength Raman scattered light, and second Raman scattered light 33 is short-wavelength Raman scattered light. Second Raman scattered light 33 passes through objective lens 24 and semitransparent mirror 23, and is reflected by mirrors 21, 22. Second Raman scattered light 33 is reflected by dichroic mirror 20 and mirror 19. Second Raman scattered light 33 passes through low-pass filter 18, and is reflected by mirror 26. Second Raman scattered light 33 is concentrated by condenser lens 28, passes through slit 30, and enters spectroscopic optical system 40. The position of an opening of slit 30 is different from the position of an opening of slit 29.

Spectroscopic optical system 40 includes collimator lenses 42, 43, a first spectrometer 44, a second spectrometer 46, and a condensing optical element 49. Spectroscopic optical system 40 may further include a mirror 41.

First Raman scattered light 31 is reflected by mirror 41, and enters collimator lens 42. Collimator lens 42 collimates first Raman scattered light 31. First Raman scattered light 31 passes through collimator lens 42, and enters first spectrometer 44. First spectrometer 44 disperses first Raman scattered light 31. First Raman scattered light 31 dispersed by first spectrometer 44 passes through condensing optical element 49, and enters photodetector 50. Condensing optical element 49 is a condenser lens, for example. Condensing optical element 49 causes first Raman scattered light 31 dispersed by first spectrometer 44 to be concentrated on a light receiving surface 51 of photodetector 50 as a plurality of first beam spots 32 (see FIG. 2).

Second Raman scattered light 33 is reflected by mirror 41, and enters collimator lens 43. Collimator lens 43 collimates second Raman scattered light 33. Second Raman scattered light 33 passes through collimator lens 43, and enters second spectrometer 46. A second incident light path 33*i*, inside spectroscopic optical system 40, of second Raman scattered light 33 to second spectrometer 46 is different from a first incident light path 31*i*, inside spectroscopic optical system 40, of first Raman scattered light 31 to first spectrometer 44. Second spectrometer 46 disperses second Raman scattered light 33. Second Raman scattered light 33 dispersed by second spectrometer 46 passes through condensing optical element 49, and enters photodetector 50. Condensing optical element 49 causes second Raman scattered light 33 dispersed by second spectrometer 46 to be concentrated on light receiving surface 51 of photodetector 50 as a plurality of second beam spots 34 (see FIG. 2).

Second spectrometer 46 is formed from a greater number of spectral optical elements than first spectrometer 44. The spectral optical element is a grating or a prism, for example. First spectrometer 44 is formed from one first spectral optical element 45. Second spectrometer 46 is formed from two second spectral optical elements 47, 48.

Photodetector 50 receives first Raman scattered light 31 and second Raman scattered light 33 output from spectroscopic optical system 40. For example, photodetector 50 is a CCD detector. As shown in FIG. 2, photodetector 50 includes light receiving surface 51 that extends in a first direction (x-direction) and a second direction (y-direction) that intersects the first direction. Photodetector 50 includes a plurality of photodetection elements 52. For example, plurality of photodetection elements 52 are a plurality of CCD chips. Plurality of photodetection elements 52 are arranged two-dimensionally. More specifically, plurality of photodetection elements 52 are arranged on light receiving surface 51, in the first direction (the x-direction) and the second direction (the y-direction). The second direction is a wavenumber resolution direction, on light receiving surface 51, of first Raman scattered light 31 by first spectrometer 44, and is also a wavenumber resolution direction, on light receiving surface 51, of second Raman scattered light 33 by second spectrometer 46. Plurality of first beam spots 32 are separated from one another in the first direction (the x-direction). Plurality of second beam spots 34 are separated from one another in the first direction (the x-direction).

When a light path of second Raman scattered light 33 is shifted, positions of plurality of second beam spots 34 on light receiving surface 51 of photodetector 50 may become shifted from positions of plurality of first beam spots 32 (for example, see a plurality of second beam spots 34*b*, 34*c* in FIG. 2). However, because plurality of photodetection elements 52 are two-dimensionally arranged, even when the light path of second Raman scattered light 33 is shifted and the positions of plurality of second beam spots 34 are shifted, photodetector 50 may reliably receive second Raman scattered light 33 (plurality of second beam spots 34). In the same manner, even when a light path of first Raman scattered light 31 is shifted and positions of plurality of first beam spots 32 on light receiving surface 51 of photodetector 50 are shifted, photodetector 50 may reliably receive first Raman scattered light 31 (plurality of first beam spots 32).

Referring to FIG. 1, signal processor 55 is connected to photodetector 50. A plurality of electrical signals output from plurality of photodetection elements 52 are processed. For example, signal processor 55 is a microcomputer including a processor, a random access memory (RAM), and a memory device such as a read only memory (ROM). As the processor, a central processing unit (CPU) may be adopted, for example. The RAM functions as a work memory that temporarily stores data that is processed by the processor. The memory device stores programs to be executed by the processor, for example. Signal processor 55 processes the plurality of electrical signals output from plurality of photodetection elements 52 through execution by the processor of a program stored in the memory device. Various processes by signal processor 55 do not have to be performed by software, and may instead be performed by dedicated hardware (electronic circuit).

For example, signal processor 55 performs binning processing on the plurality of electrical signals output from plurality of photodetection elements 52. The binning processing refers to collective processing of electrical signals output from photodetection elements 52, the processing being performed for each of a plurality of photodetection element groups 53*a* to 53*k* (see FIG. 2) among plurality of photodetection elements 52. For example, each of plurality of photodetection element groups 53*a* to 53*k* includes two rows of photodetection elements 52 among plurality of photodetection elements 52. For example, signal processor 55 may calculate a sum of electrical signals output from photodetection elements 52, for each of plurality of photodetection element groups 53*a* to 53*k*, or may calculate an average of electrical signals output from photodetection elements 52, for each of plurality of photodetection element groups 53*a* to 53*k*.

Even when first Raman scattered light 31 and second Raman scattered light 33 are weak, electrical signals of first Raman scattered light 31 and second Raman scattered light 33 may be reliably obtained by the binning processing. Furthermore, even when the light path of second Raman scattered light 33 is shifted and the positions of plurality of second beam spots 34 on light receiving surface 51 of photodetector 50 are shifted (for example, see plurality of second beam spots 34*b*, 34*c* in FIG. 2), the binning processing allows accurate light intensity of each of plurality of second beam spots 34 to be obtained. An accurate Raman spectrum of second Raman scattered light 33 may be obtained by the binning processing. In the same manner, even when the light path of first Raman scattered light 31 is shifted and the positions of plurality of first beam spots 32 on light receiving surface 51 of photodetector 50 are shifted, an accurate Raman spectrum of first Raman scattered light 31 may be obtained by the binning processing.

Raman spectroscopy device 1 may further include illumination light source 60, objective lens 24, camera 63, and imaging lens 62, and may be a Raman spectroscopy microscope.

Illumination light source 60 emits illumination light 61 for illuminating sample 25. For example, illumination light source 60 is a light-emitting diode (LED). For example, illumination light 61 is visible light. Illumination light 61 that is irradiated on sample 25 passes through objective lens 24, and is reflected by semitransparent mirror 23. Illumination light 61 passes through imaging lens 62, and enters camera 63. Imaging lens 62 forms an image of sample 25 on a light receiving surface 64 of camera 63. Camera 63 includes a CMOS sensor, for example.

Advantageous effects of Raman spectroscopy device 1 of the present embodiment will be described in comparison with Raman spectroscopy devices of first to third comparative examples.

The Raman spectroscopy device of the first comparative example includes a first condensing optical element and a first photodetector for first Raman scattered light 31, and a second condensing optical element and a second photodetector for second Raman scattered light 33. In contrast, with Raman spectroscopy device 1 of the present embodiment, condensing optical element 49 and photodetector 50 are used for both first Raman scattered light 31 and second Raman scattered light 33. The number of condensing optical elements and the number of photodetectors are smaller for Raman spectroscopy device 1 of the present embodiment than for the Raman spectroscopy device of the first comparative example. Accordingly, the cost of Raman spectroscopy device 1 of the present embodiment is lower than that of the Raman spectroscopy device of the first comparative example.

Because the second wavelength of second excitation light beam 13 is shorter than the first wavelength of first excitation light beam 11, a wavelength range of second Raman scattered light 33 corresponding to a certain measurable wavenumber range is smaller than a wavelength range of first Raman scattered light 31 corresponding to the measurable wavenumber range in question. To increase a measurable wavenumber range of the Raman spectrum of second Raman scattered light 33 to about the same as a measurable wavenumber range of the Raman spectrum of first Raman scattered light 31, for example, angular dispersion of second spectrometer 46 has to be made greater than angular dispersion of first spectrometer 44.

With the Raman spectroscopy device of the second comparative example, first spectrometer 44 and second spectrometer 46 are formed from the same number of spectral optical elements, and the spectral optical element forming second spectrometer 46 has greater angular dispersion than the spectral optical element forming first spectrometer 44. However, the cost of the spectral optical element is drastically increased as wavelength resolution of the spectral optical element is increased. Accordingly, with the Raman spectroscopy device of the second comparative example, when the measurable wavenumber range of the Raman spectrum of second Raman scattered light 33 is increased to about the same as the measurable wavenumber range of the Raman spectrum of first Raman scattered light 31, for example, the cost of the Raman spectroscopy device of the second comparative example is increased.

In contrast, with Raman spectroscopy device 1 of the present embodiment, second spectrometer 46 is formed from a greater number of spectral optical elements than first spectrometer 44. Accordingly, the angular dispersion of second spectrometer 46 may be made greater than the angular dispersion of first spectrometer 44 while using an inexpensive spectral optical element as each of a plurality of spectral optical elements forming second spectrometer 46. Accordingly, the cost of Raman spectroscopy device 1 of the present embodiment is reduced than the cost of the Raman spectroscopy device of the second comparative example even when the measurable wavenumber range of the Raman spectrum of second Raman scattered light 33 is increased to about the same as the measurable wavenumber range of the Raman spectrum of first Raman scattered light 31, for example.

With the Raman spectroscopy device of the third comparative example, second incident light path 33*i*, inside spectroscopic optical system 40, of second Raman scattered light 33 to second spectrometer 46 is the same as first incident light path 31*i*, inside spectroscopic optical system 40, of first Raman scattered light 31 to first spectrometer 44. Accordingly, the Raman spectroscopy device of the third comparative example requires a movement mechanism for switching between first spectrometer 44 and second spectrometer 46.

In contrast, with Raman spectroscopy device 1 of the present embodiment, second incident light path 33*i*, inside spectroscopic optical system 40, of second Raman scattered light 33 to second spectrometer 46 is different from first incident light path 31*i*, inside spectroscopic optical system 40, of first Raman scattered light 31 to first spectrometer 44.

Accordingly, Raman spectroscopy device 1 does not need a movement mechanism for moving first spectrometer 44 and second spectrometer 46. The cost of Raman spectroscopy device 1 of the present embodiment is lower than the cost of the Raman spectroscopy device of the third comparative example. The Raman spectrum of first Raman scattered light 31 and the Raman spectrum of second Raman scattered light 33 may be more accurately and stably obtained by Raman spectroscopy device 1 of the present embodiment than by the Raman spectroscopy device of the third comparative example.

With Raman spectroscopy device 1 of a modification of the present embodiment, the number of excitation light sources may be three or more.

Mode

The exemplary embodiment described above should be understood by those skilled in the art to be a specific example of the modes described below.

(First Aspect) A Raman spectroscopy device according to a mode includes a spectroscopic optical system and a photodetector. The spectroscopic optical system includes a first spectrometer and a second spectrometer. The first spectrometer disperses first Raman scattered light that is emitted from a sample when the sample is irradiated with a first excitation light beam. The second spectrometer disperses second Raman scattered light that is emitted from the sample when the sample is irradiated with a second excitation light beam having a shorter wavelength than the first excitation light beam, the second Raman scattered light having a shorter wavelength than the first Raman scattered light. The photodetector receives the first Raman scattered light and the second Raman scattered light output from the spectroscopic optical system. A second incident light path, inside the spectroscopic optical system, of the second Raman scattered light to the second spectrometer is different from a first incident light path, inside the spectroscopic optical system, of the first Raman scattered light to the first spectrometer. The second spectrometer is formed from a greater number of spectral optical elements than the first spectrometer.

The photodetector is used for both the first Raman scattered light and the second Raman scattered light. Accordingly, the cost of the Raman spectroscopy device is reduced. Furthermore, the second spectrometer is formed from a greater number of spectral optical elements than the first spectrometer, and thus, the angular dispersion of the second spectrometer may be increased while using low-cost spectral optical elements as the spectral optical elements that form the second spectrometer. Accordingly, the measurable wavenumber range of the Raman spectrum of the second Raman scattered light may be increased, and also, the cost of the Raman spectroscopy device is reduced. Moreover, the second incident light path, inside the spectroscopic optical system, of the second Raman scattered light to the second spectrometer is different from the first incident light path, inside the spectroscopic optical system, of the first Raman scattered light to the first spectrometer. Accordingly, the Raman spectroscopy device does not need a movement mechanism for moving the first spectrometer and the second spectrometer. The cost of the Raman spectroscopy device is reduced.

(Second Aspect) With the Raman spectroscopy device according to the first aspect, the first spectrometer is formed from one spectral optical element. The second spectrometer is formed from two spectral optical elements.

Accordingly, the number of spectral optical elements for forming the first spectrometer and the second spectrometer may be minimized. The cost of the Raman spectroscopy device is reduced.

(Third Aspect) With the Raman spectroscopy device according to the first or second aspect, the spectroscopic optical system includes a condensing optical element. The condensing optical element causes the first Raman scattered light output from the first spectrometer and the second Raman scattered light output from the second spectrometer to be concentrated on the photodetector.

The condensing optical element is used for both the first Raman scattered light and the second Raman scattered light. Accordingly, the cost of the Raman spectroscopy device is reduced.

(Fourth Aspect) With the Raman spectroscopy device according to any one of the first to third aspects, the photodetector includes a plurality of photodetection elements that are two-dimensionally arranged.

Accordingly, even when a light path of the first Raman scattered light or a light path of the second Raman scattered light is shifted, the photodetector is able to reliably receive the first Raman scattered light and the second Raman scattered light. The Raman spectroscopy device is able to reliably obtain the Raman spectrum. Freedom of design of the optical system of the Raman spectroscopy device is increased.

(Fifth Aspect) The Raman spectroscopy device according to the fourth aspect further includes a signal processor that is connected to the photodetector. The signal processor performs binning processing on a plurality of electrical signals that are output from the plurality of photodetection elements.

Accordingly, even when the first Raman scattered light and the second Raman scattered light are weak, electrical signals of the first Raman scattered light and the second Raman scattered light may be reliably obtained. Even when the light path of the first Raman scattered light or the light path of the second Raman scattered light is shifted, the Raman spectrum of the first Raman scattered light and the Raman spectrum of the second Raman scattered light may be obtained more accurately.

The embodiment and the modification disclosed herein are illustrative in every aspect, and should be understood to be non-restrictive. The scope of the present disclosure is indicated not by the description given above but by the scope of the claims, and is intended to include all the changes within the scope and meaning equivalent to those of the scope of the claims.

REFERENCE SIGNS LIST

1 Raman spectroscopy device; 10 first excitation light source; 11 first excitation light beam; 12 second excitation light source; 13 second excitation light beam; 15, 16, 19, 21, 22, 26, 41 mirror; 17, 18 low-pass filter; 20 dichroic mirror; 23 semitransparent mirror; 24 objective lens; 25 sample; **25*a* sample support portion; 27, 28 condenser lens; 29, 30 slit; 31 first Raman scattered light; 31*i* first incident light path; 32 first beam spot; 33 second Raman scattered light; 33*i* second incident light path; 34, 34*b*, 34*c* second beam spot; 40 spectroscopic optical system; 42, 43 collimator lens; 44 first spectrometer; 45 first spectral optical element; 46 second spectrometer; 47, 48 second spectral optical element; 49 condensing optical element; 50 photodetector; 51 light receiving surface; 52 photodetection element; 53*a*** to 53*k* photodetection element group; 55 signal processor; 60 illumination light source; 61 illumination light; 62 imaging lens; 63 camera; 64 light receiving surface

The invention claimed is:

1. A Raman spectroscopy device comprising:

a spectroscopic optical system; and a photodetector, wherein the spectroscopic optical system includes a first spectrometer for angularly dispersing first Raman scattered light that is emitted from a sample when the sample is irradiated with a first excitation light beam, and a second spectrometer for angularly dispersing second Raman scattered light that is emitted from the sample when the sample is irradiated with a second excitation light beam having a shorter wavelength than the first excitation light beam, the second Raman scattered light having a shorter wavelength than the first Raman scattered light, the photodetector receives the first Raman scattered light and the second Raman scattered light output from the spectroscopic optical system, the second spectrometer is formed from a greater number of angular dispersive elements than the first spectrometer, the first spectrometer is arranged on a first light path of the first Raman scattered light and is not arranged on a second light path of the second Raman scattered light, and the second spectrometer is arranged on the second light path of the second Raman scattered light and is not arranged on the first light path of the first Raman scattered light.

2. The Raman spectroscopy device according to claim 1, wherein the first spectrometer is formed from one angular dispersive element, and the second spectrometer is formed from two angular dispersive elements.

3. The Raman spectroscopy device according to claim 1, wherein the spectroscopic optical system includes a condensing optical element, and the condensing optical element causes the first Raman scattered light output from the first spectrometer and the second Raman scattered light output from the second spectrometer to be concentrated on the photodetector.

4. The Raman spectroscopy device according to claim 1, wherein the photodetector includes a plurality of photodetection elements that are two-dimensionally arranged.

5. The Raman spectroscopy device according to claim 4, further comprising a signal processor that is connected to the photodetector, wherein the signal processor performs binning processing on a plurality of electrical signals that are output from the plurality of photodetection elements.

* * * * *